United States Patent
Korolev et al.

(10) Patent No.: US 8,024,712 B1
(45) Date of Patent: *Sep. 20, 2011

(54) COLLECTING APPLICATION LOGS

(75) Inventors: Eugenio Korolev, Framingham, MA (US); Charuta Vijaykumar Apte, Milford, MA (US); Anoop George Ninan, Milford, MA (US); Boris Farizon, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 1349 days.

This patent is subject to a terminal disclaimer.

(21) Appl. No.: 11/540,183

(22) Filed: Sep. 29, 2006

(51) Int. Cl.
*G06F 9/44* (2006.01)
(52) U.S. Cl. ........................................ 717/127
(58) Field of Classification Search .................. 709/220, 709/224, 225, 229; 707/648, 797; 726/23; 713/201; 717/117, 176, 127
See application file for complete search history.

(56) References Cited

U.S. PATENT DOCUMENTS

| | | | |
|---|---|---|---|
| 5,495,607 A * | 2/1996 | Pisello et al. | 707/797 |
| 7,395,322 B2 * | 7/2008 | Harvey et al. | 709/220 |
| 7,653,633 B2 * | 1/2010 | Villella et al. | 707/648 |
| 2002/0062373 A1 * | 5/2002 | Skingle | 709/225 |
| 2002/0138762 A1 * | 9/2002 | Horne | 713/201 |
| 2002/0184366 A1 * | 12/2002 | Kimoto et al. | 709/224 |
| 2004/0054504 A1 * | 3/2004 | Chang et al. | 702/186 |
| 2005/0228880 A1 * | 10/2005 | Champlin | 709/224 |
| 2006/0179484 A1 * | 8/2006 | Scrimsher et al. | 726/23 |
| 2007/0226358 A1 * | 9/2007 | Krywaniuk | 709/229 |

* cited by examiner

*Primary Examiner* — Tuan Anh Vu
(74) *Attorney, Agent, or Firm* — Krishnendu Gupta; Gerald P. Kazanjian

(57) ABSTRACT

Techniques for locating and collecting application logs are disclosed. Embodiments disclosed herein can be advantageously utilized to collect application logs from a plurality of computers in a network. For example, embodiments disclosed herein can be used to identify and collect application logs from a plurality of host computers in a storage area network.

20 Claims, 2 Drawing Sheets

COLLECTING APPLICATION LOGS

FIELD OF THE INVENTION

The present disclosure relates generally to collecting application logs. For example, a log collection utility is disclosed, which can be used to collect application logs from a plurality of host computers in a storage area network.

BACKGROUND

The rapid expansion of information service and data processing industries has resulted in a need for computer systems to manage and store large amounts of data. As an example, financial service industry businesses such as banks, mutual fund companies or the like often operate complex data processing systems that require access to many hundreds of gigabytes or even terabytes of data. Data storage system developers have responded to these types of data storage requirements by integrating large capacity data storage systems known as storage arrays, as well as data communications devices and computer systems into networks called "storage networks" or "storage area networks" ("SANs"). A storage area network is a collection of data storage systems that are networked with a number of host computer systems that operate as servers to access data stored in the data storage systems. Components of a typical conventional storage area network implementation include one or more connectivity devices such as high speed data switches that interconnect the various data storage systems to each other and to one or more host or server computer systems ("servers") that require access to (e.g., read and/or write) the data in the data storage systems on behalf of client software applications and/or client computer systems to communicate with the servers. A SAN is thus a fabric that routes input/output requests in data access protocols such as SCSI, iSCSI, Fiberchannel, or others from servers through switches to one or more data storage systems for access to data stored in those storage systems.

A developer or administrator of a storage area network environment may install one or more distributed storage area network management software applications within the storage area network to manage or administer the various resources (i.e., devices, computer systems, storage systems, etc.) that operate within the storage area network. A network administrator (i.e., a person) responsible for management of the storage area network operates a network management software application to perform management tasks such as performance monitoring, network analysis, remote configuration, storage provisioning, and other administration of the various resources (e.g., devices and software) operating within the storage area network.

A typical conventional SAN-management software application may have several different software components or processes that execute independently of each other in a distributed manner on different computer systems but that collectively interoperate together to perform network management. As an example, conventional designs of storage area network management applications can include console, server, agent, and storage or database management software components or processes that each perform a specific role in storage area network management.

Generally, the server component or process operates as a central control process within the storage area network management application and coordinates communication between the console, storage, and agent components. The console component or process often executes within a dedicated storage area network management workstation to allow a network administrator (i.e., a person or people responsible for management of the storage area network) to visualize and remotely control and manage the various components within the storage area network that are displayed on a graphical user interface within a display on the console computer system. Agent components or processes execute on the various host computer systems such as servers distributed throughout the storage area network to manage various types of storage area network resources. As an example, there may be different respective agents specifically designed (e.g., coded in software) to remotely manage, control, and collect data from data storage system resources, database applications, switches, and so forth.

Agent processes receive remote management commands from the server process and apply functionality associated with those management commands to the managed resources within the storage area network for which those agents are designated to manage. Agents may receive a command, for example, to collect or discover configuration or management data concerning the network resources that those agents manage. This device discovery data collection process can happen in a scheduled or periodic manner, or in response to a command received from the management server. When agents are finished processing a command, results are returned to the store process for storage within a database. The server can then access the database to view the results of the command sent to the agent process.

SUMMARY

Conventional applications that manage resources in a SAN often create log files of information. The applications maintain log files to keep a history of the operation of the applications. As an example, a switch vendor may create a management application to manage switches in a SAN. As the application operates to manage the switch, the switch management application can keep records in one or more log files that indicate, for example, a command history of what the application did to control and manage the switch. Log files are useful for diagnosing resource problems, security issues, SAN operations and so forth. As an example, an administrator of a SAN can review the log files in response to a problem with a particular SAN resource such as the switch to help identify a source of the problem.

Conventional techniques for collection of log files suffer from various problems. Consider a SAN having many hundreds of host computer systems, each operating various SAN management software applications. As an example, hosts in a SAN may operate many different agent software processes, third party application software processes, and even operating system processes that each produce log files. Conventional techniques for collection of log files entail a person, such as the network administrator, manually logging into each host computer system. Once logged in, that person must identify what applications that might produce log files are installed and operating on that host. Once the applications are identified, the person must determine where those applications maintain their log files. Typically, each application is installed in a specific installation directory within the file system directory structure. For example, an administrator who installs a switch management application on a host might create a "/applications/SAN management/switch" directory into which the switch management software is installed. This directory is known as the "installation directory", "home directory" or "root directory" for the switch management application. In most file systems, a "root" directory is the top level directory (i.e., "/"). Thus the "/applications/SAN management/switch" directory is a path, relative to the root directory "/" into which the management application is stored. During installation, the switch management application might create a set of sub-directories under "/applications/SAN management/switch" for various parts of the application. One of those directories might be, for example, "/applications/SAN management/switch/logs" for storage of log file information. Due to the manual nature of this log file collection effort, the administrator might not find all required log files or may not know of each application installed on a particular host.

For an administrator to collect log files for each application, the administrator must not only remember the installation directory for each application, but he or she must also know the log file directory (i.e., a directory under the installation directory) for that application. Once known, the administrator must navigate to that location to access the log files of interest. This may include finding and then manually transferring the log files to a remote computer system for analysis or post-processing (e.g., to discover the nature of the problem). For complex applications, log files might even be stored in different locations. In summary, conventional processes for collection of log files require an intimate knowledge of application installation and log file storage information. Additionally, such conventional processes are highly manual in nature and are prone to error.

The present disclosure provides for improved application-log collection. Techniques for automated (i.e., non-manual) collecting of logs from applications installed on remote computers in a network such as a SAN are disclosed.

In a first example embodiment disclosed herein, information sufficient to locate at least one log associated with an application on a first computer is acquired. Software containing the acquired information is created. The software is configured to collect the at least one log and to transfer collected logs to a second computer.

A second example embodiment, disclosed herein, comprises software encoded in one or more computer-readable media. When the software is executed on a first computer in a network including a plurality of computers, it is operable to collect at least one log associated with an application on the first computer, the location of the at least one log being identified in the software; and to transfer collected logs to a second computer in the network.

In a third example embodiment, a network is disclosed. The network comprises a first computer and a second computer. The first computer contains software encoded in one or more computer-readable media and, when executed on the second computer, is operable to collect at least one log associated with an application on the second computer, the location of the at least one log being identified in the software; and to transfer collected logs to the first computer in the network. The second computer is configured to receive the software, to execute the software, and to transfer collected logs to the first computer.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not meant to limit the scope of the invention. For clarity, not every element may be labeled in every figure. The drawings are not necessarily to scale, emphasis instead being placed upon illustrating the principles of the invention.

DETAILED DESCRIPTION OF THE INVENTION

Embodiments disclosed herein can be advantageously utilized to collect application logs. Techniques for collecting logs from remote computers in a network are disclosed. For example, embodiments disclosed herein can be used to collect application logs from a plurality of host computers in a storage area network.

Figure 1:
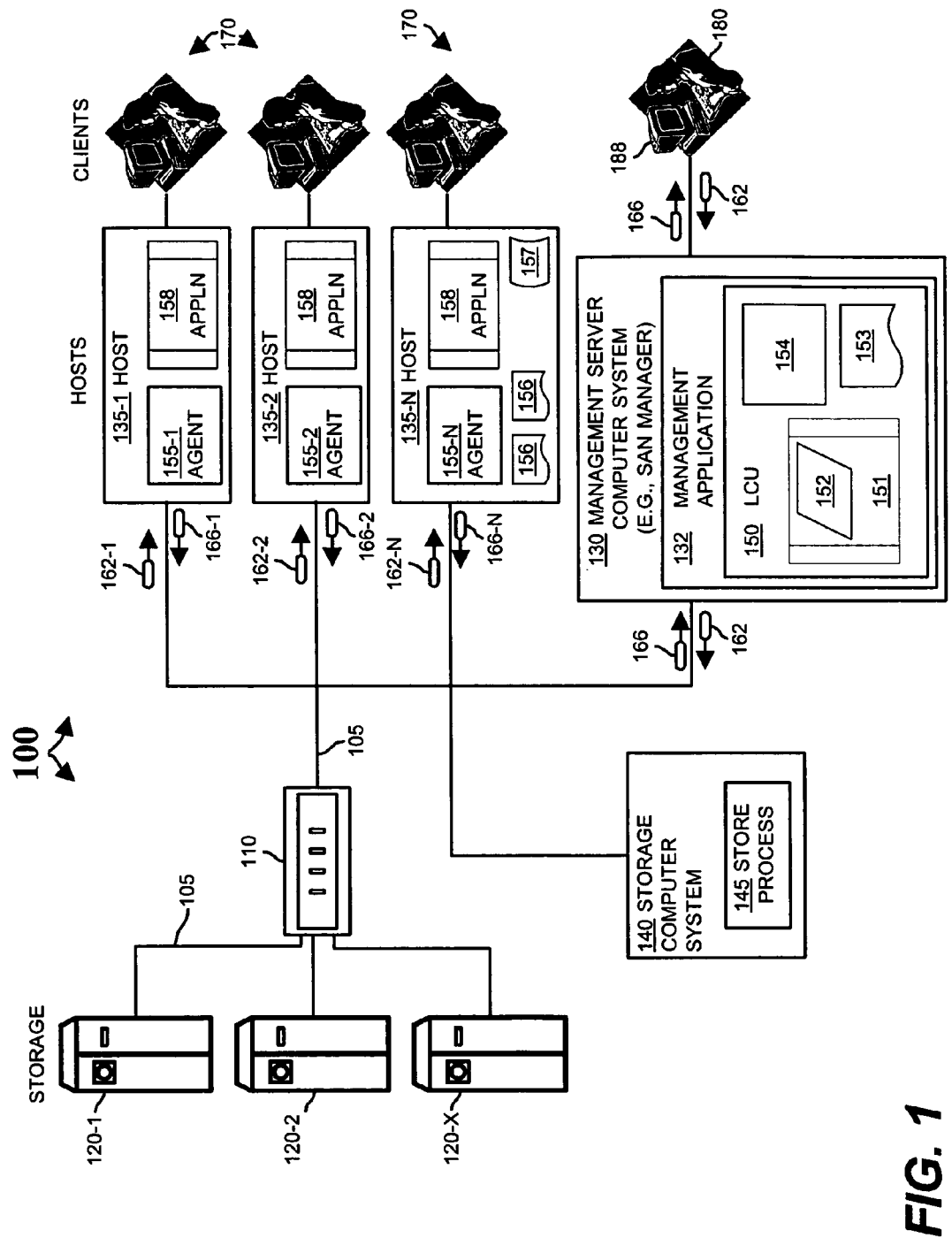
FIG. 1 illustrates an example storage area network and computing system environment configured to operate according to embodiments disclosed herein.

FIG. 1 illustrates an example of a networking environment suitable for use in explaining example embodiments. In this example, the networking environment is a storage area network 100 that includes a communications medium 105 that interconnects a plurality of data storage systems 120-1 through 120-X through one or more connectivity devices 110 (e.g., storage area network switches) to a plurality of host computer systems 135-1 through 135-N that serve data to client computer systems 170.

This example storage area network 100 includes a management server computer system 130 that operates a management application 132 (i.e., a computer software application) that includes a Log Collection Utility ("LCU") 150 configured in accordance with embodiments of the invention. In addition, the storage area network 100 includes at least one storage computer system 140 that, in this example, operates at least one store process 145. A plurality of agent software processes 155-1 through 155-N operate within one or more of the host computer systems 135-1 through 135-N. Generally, the agents 155 and store processes 145 interoperate with, and are collectively considered parts of the management application 132. A network administrator 180 interacts via a console computer system 188 with the management application 132 executing on the management server computer system 130 in order to remotely administer manageable resources within the storage area network 100. Manageable resources include, for example, data storage systems 120, the connectivity devices 110, and the host computer systems 135, and many other types of hardware or software entities within the storage area network 100.

According to the general operation of the storage area network shown in FIG. 1, the client computer systems can operate various client software applications (not specifically shown) that communicate with server applications (not specifically shown) operating within the host computer systems 135 in order to access data stored within the data storage systems 120 over the storage area network 100. During the operation of the client software applications, and other computer software applications (not specifically shown) operating on computers in the network 100, logs associated with these applications may be kept in one or more files for each application. These logs frequently contain information that is useful to network administrators 180. For example the logs may contain information useful for debugging or tracking computer applications and systems.

In conventional storage area networks as explained above, a network administrator 180 uses File Transfer Protocol ("FTP") to retrieve logs from the various computers in the network 100, such as the host computers 135, for example. That is, the network administrator 180 can manually log into a console computer system 188 as an FTP client and then use FTP to download desired logs to the console computer system

188. This network administrator 180 is commonly referred to as a Storage Administrator. Retrieving logs from computers in this manner can be cumbersome and time-consuming. Additionally, the Storage Administrator frequently cannot login as an FTP client until the Storage Administrator has obtained necessary information (e.g., a login name and password) from another network administrator 180.

Particular embodiments disclosed herein are concerned with the automated retrieval of logs from computers in a network, such as the computers in the example storage area network 100. According to the general operation, the Log Collection Utility (LCU) 150 is equipped to access a file 153 that specifies information about log file locations for a set of applications 158 operating on various hosts 135 within the SAN 100. As an example, the file 153 may be an extensible Markup Language (XML) file listing details of information about various applications 158 that may or may not be installed on various hosts 135 in the SAN 100. Such details of file 153 can include:

Application name (e.g. Oracle)

Application type (e.g. third party, infrastructure, operating system, etc.) and a sub-type, such as a specific identity of the application. Application type information can be used to classify and identify log information that may be collected and is used to help a user understand what log files are associated with which applications.

Log file location information such as an environment variable(s) or registry key(s) that indicates an installation directory on a host computer 135 in the SAN 100 within which the application is installed.

A log file specification of log information to be collected. This may include a file system path specification, relative to the installation directory of the application, from which to collect log files, along with the file name or a regular expression that indicates a set of files to be collected.

Using the information within the file 153, the LCU 150 can be activated by a user in one of two modes. In a first "LOCATE" mode, the LCU 150 creates software 151 such as a Perl script that can be transferred to a remote host 135 to generate (i.e., identify) a list of applications 158 installed on that host 135. In this first mode then, the LCU produces a script 151 that contains information from the file 153 for each application specified in the file 153. In particular, the script 151 in the "LOCATE" mode is dynamically created by the LCU 150 to contain commands that attempt to evaluate, on a host computer 135, each environment variable or registry key specified in the location file 153 for each application in that file. Once transferred to a host 135 (as shown by command 162), the script 151 is executed on the host 135 and attempts to determine the presence of each application listed in the file 153. The script may attempt to determine the presence of an application by trying to evaluate each environment variable or registry key. Other means of attempting to determine the presence of an application may include looking for a hard-coded well-known path, looking for a script, looking for a path value inside another file, etc. If any evaluate to a non-null value, that is an indication that a particular application is installed on that host 135, and the script 151 maintains a list of those installed applications. In other words, in the LOCATE mode, the LCU produces a script 151 that is sent to one or more hosts 135 to attempt to evaluate, on that host, a registry key or environment variable that an application will have established on a host 135, if that application is actually installed on that host 135. While executing on the remote host 135, the script remembers and tracks which of the environment variable or registry keys evaluate to a non-null value. Those that are non-null indicate that an application 158 associated with that environment variable or registry key is installed on that host 135 and therefore log file information can be collected from this host. This application list is then transferred (via message 166) back to the LCU 150 operating on the management server 130. The LCU 150 can show this list to the user to indicate, for a particular host 135, which of the applications listed in the file 153 are actually installed on that host 135. In this manner, in the LOCATE mode, the LCU 150 is able to produce a list of any applications 158 installed on a particular host 135. The LOCATE mode does not result in collection of log files for those applications, but rather reports back to the LCU 150 a list of applications from which log files may be collected at the option of a user of the LCU 150.

In a second mode of operation, known as the COLLECT mode, The user of the LCU 150 can indicate that the LCU 150 is to produce a script 151 that is to be sent via message 162 to a particular host 135 (or set of hosts 135) to actually collect log files 156. In COLLECT mode, the LCU 150 is activated by a user to create a script 151 (e.g. another Perl script) that contains commands to locate and collect log files 156 for specific applications 158 (from a list specified by a user as determined by results returned from the LOCATE mode) from a remote host 135. The LCU 150 thus produces a script 151 that contains commands to collect log files for specific applications using information about the location of those log files from the file 153. Specifically, since the log collection information within the XML file 153 indicates a relative installation path of an application, along with a specification of specific log file locations as additional path expressions relative to the relative installation path or directory of the application, the script 151 can contain log collection information 152 that indicates which logs are to be collected and where in the file system of a remote host the log files are to be collected from. In COLLECT mode, the LCU 150 transfers, via message 162, this script 151 containing log file collection information 152, to a remote host 135. An agent 155 on the remote host receives this script 151 (via message 162) and executes this script 151 to traverse the file system of the host 135 to each application directory containing log files (as specified as tagged fields in the XML file 153 from which the LCU 150 built the script 151) and to capture those log files 156 as collected logs 157 for transfer back to the LCU 150. Capturing can involve combining or archiving all log files 156 into an archive file 157 on the remote host 135 and then transferring that single archive file 157 back to the LCU 150, or each identified log file 156 can be transferred separately back to the LCU 150 and the LCU 150 can archive them together on the management server 130, thus offloading the archiving activity from each remote host 135. Data compression may be used to create an archive file. Thus, an archive file may contain one or more files that have been compressed or stored. Accordingly, the COLLECT mode allows collection and transfer of log files 156 from remote hosts 135 to the management server 130 (i.e. to the LCU 150) in an automated manner that avoids a user having to remember, for each application 158, where particular logs are stored.

Figure 2:
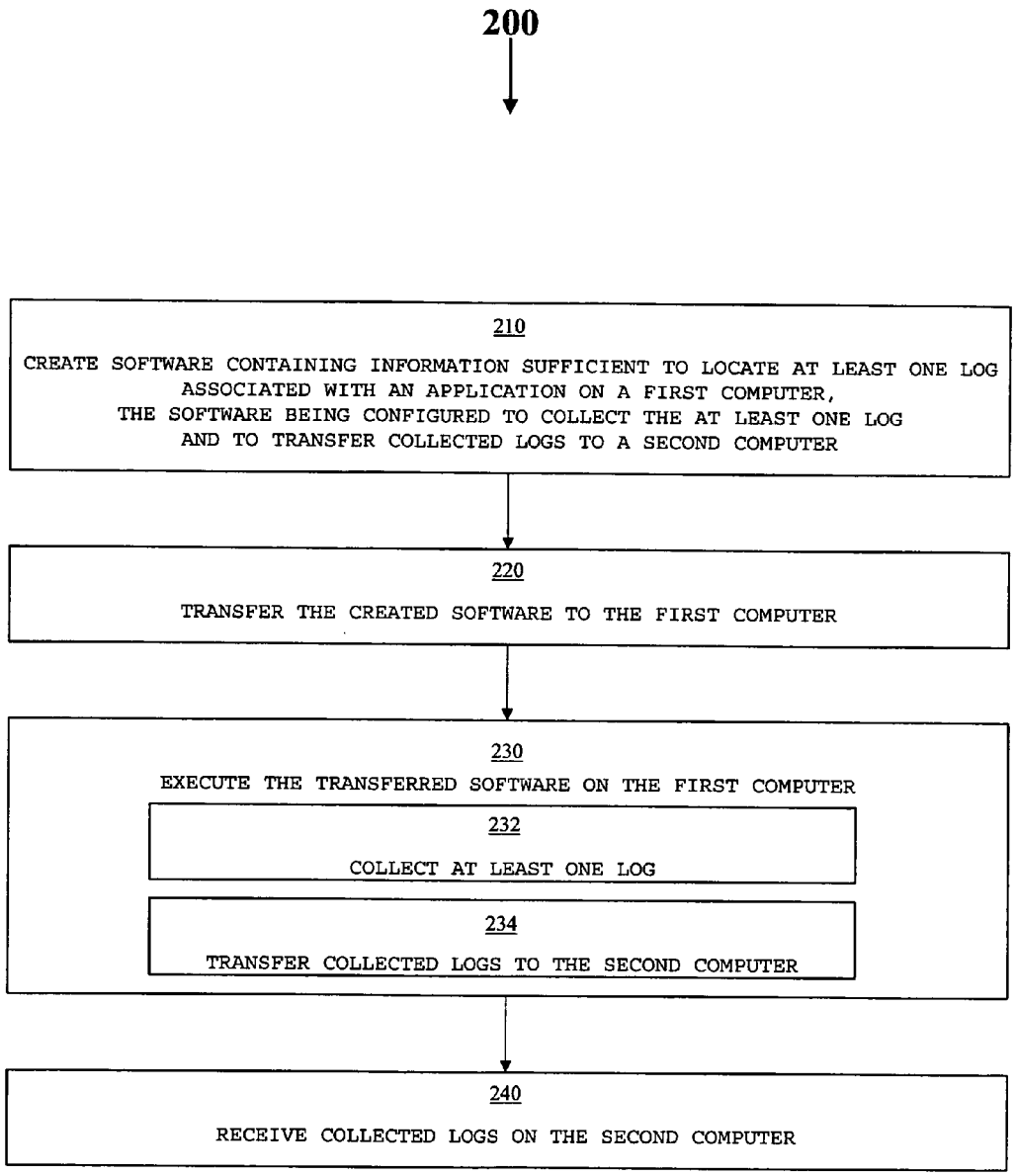
FIG. 2 is a flow chart of processing steps configured to collect application logs according to embodiments disclosed herein.

FIG. 2 is a flow chart 200 of processing steps configured to collect application logs 156 according to embodiments disclosed herein. Step 210 involves creating software 151 containing information 152 sufficient to locate at least one log 156 associated with an application 158 on a first computer (e.g., 135-N). In another embodiment, the software 151 is configured to locate and collect the at least one log 156 and to transfer collected logs 157 to a second computer (e.g., 130 or 188). Applications 158 with which logs 156 are associated may be any type of software application that creates or keeps log(s) 156. The system maintains log file identification and location information in a file 153, such as an XML file, that may include, for example, a path name that indicates precisely where a file containing the log is located, or an installation registry key or environment variable indicating an installation directory of an application 158, along with log file specification information that indicates, relative to this root or installation directory, where specific log files are stored for that application. The location information may also include other information, such as identification of the operating system on which the application operates, Registry values, Environment Variables, and so on that help identify log file locations and associations to specific applications 158.

In particular embodiments, this log-location information is acquired by the LCU 150 from information stored in an Extensible Markup Language ("XML") file 153. Thus, in particular embodiments, step 210 may comprise acquiring the information from information stored in an XML file 153. A network administrator 180 may create or update such XML files over time by interacting with the LCU 150. As new or additional information about the kinds of available applications and logs become available along with where the logs for those applications are stored becomes known, a network administrator can enter the information in the XML file 153. This only need b done once. The LCU 150 can provide a user interface 154, such as a Graphical User Interface ("GUI"), to facilitate the entering of the information into the XML file 153 by the network administrator 180.

During operation, the LCU 150 is activated in one of the LOCATE or COLLECT modes explained above which results in the LCU reading the XML file 135 and creating software 151 in the form of a program or script to be sent to one or more remote hosts 135. The created software 151 may be encoded in one or more computer-readable media. When executed on a first computer 135 in a network 100 including a plurality of computers, the created software 151 is operable to identify the existence of, and/or collect at least one log 156 associated with an application 154 on the first computer 135. The location of the at least one log is identified in the software 151 as the LCU creates the software script 151. That is, the software 151 during execution contains information sufficient to locate logs to be identified as being present (in LOCATE mode), or to be collected (in COLLECT mode). One example of how logs can be collected is to have commands in the script 151 that copy log files 156 into a single directory on a host 135. The agent 155 on a host 135 can thereafter handle the process of transferring each log file 157 (collected logs 157) back to the LCU one by one for arrangement into a single file such as an archive file. Alternatively, the agent 155 that receives and executes the script file software 151 (received from the LCU 150) on the host 135 can have the script (or the agent itself) combine all collected logs 157 into a single file, such as an archive file, for transmission back to the LCU 150.

When executed on a first computer 135, the created software 151 is operable to transfer collected logs 157 to a second computer 130, 188 in the network. The logs can be transferred to a second computer 130, 188 in the network by copying log files over the network's communication medium 105 to the second computer 130, 188. In particular embodiments, log files may be compressed into a single file 157 prior to being transferred to the second computer. Compression techniques useful in compressing log files 156 prior to transmission are known in the art.

In particular embodiments, the created software 151 comprises a Perl Script. Perl Scripts are script files written in the Perl programming language. Perl, also Practical Extraction and Report Language, is a general-purpose programming language. Although Perl was originally developed for text manipulation, it is now used for a wide range of tasks including system administration, web development, network programming, and GUI development, for example. Perl supports both procedural and object-oriented programming.

Step 220 involves transferring the created software 151 to the first computer 135. This transferring can be accomplished in any way known in the art. In one example embodiment, the network administrator 180 can operate the console computer system 188 to cause the LCU 150 in the management server 132 to send a command 162 to an agent 155 for execution by that agent. Commands 162-1 through 162-N represent commands sent to each agent 155-1 through 155-N. The command 162 may contain the created software 151 to be transferred to the first computer 135, such as a host computer 135 in the example storage area network 100.

Step 230 involves executing the transferred software on the first computer. As discussed above, the software is configured to collect the at least one log and to transfer collected logs to a second computer. In particular embodiments, commands 162 containing the created software 151 (e.g., a Perl Script) may be transferred to an agent 155 on a host computer 135. The agent 155 processes the command 162, causing the created software 151 to be executed on the host computer 135. During execution of the software 151 on the host computer 135, the software 151 collects log files 156. After the log files 156 are collected, the executing software compresses the log files 156 into an archive file format 157. The software 151 contains instructions to the agent 155 to transfer the archive file 157 to a second computer. The second computer may be the management server computer system 130 or the console computer system 188, for example. In step 240, the collected logs 157 transferred from the first computer 135 are received by the second computer 130, 188.

The present disclosure provides for improved application-log collection. While the present invention has been shown and described herein with reference to specific embodiments thereof, it should be understood by those skilled in the art that variations, alterations, changes in form and detail, and equivalents may be made or conceived of without departing from the spirit and scope of the invention. Accordingly, the scope of the present invention should be assessed as that of the appended claims and by equivalents thereto.

What is claimed is:

1. A method comprising:
    obtaining information at a first computer regarding a location in a second computer of at least one log associated with an application resident on the second computer;
    creating software at the first computer configured to execute on the second computer to collect the at least one log at the second computer of the at least one log, and to transfer the collected at least one log to the first computer;
    transferring the created software from the first computer to the second computer for execution at the second computer; and
    receiving at the first computer, in response to execution of the transferred software on the second computer, the collected at least one log from the second computer.

2. The method of claim 1 wherein obtaining information at a first computer regarding a location in a second computer of at least one log associated with an application resident on the second computer comprises:

obtaining application installation location information indicating an installation location of an application on a computer system;

obtaining a set of log locations indicating a location of logs associated with the application relative to the application installation location information; and for each log location in the set of log locations, creating a command in the software to locate the existence of logs on the first computer using the application installation location information and using the log locations indicating a location of logs associated with the application.

3. The method of claim 2 further comprising:

for each log location in the set of log locations, creating a command in the software to collect existing logs on the first computer as a set of collected logs; and creating a command to transfer the collected logs back to a second computer.

4. The method of claim 3 wherein obtaining application installation location information indicating an installation location of an application on a computer system comprises:

obtaining at least one of an environment variable and a registry key that can be evaluated on the first computer to identify an installation directory associated with the application.

5. The method of claim 4 wherein obtaining a set of log locations indicating a location of logs associated with the application relative to the application installation location information comprises:

obtaining a relative file path specification of a log directory, relative to the evaluated value of at least one of the environment variable and a registry key, within which log files for the application are stored on the first computer;

obtaining a file name expression indicating at least one log located at the relative file path specification of the log directory for the application; and wherein creating a command in the software to locate the existence of logs on the first computer using the application installation location information and using the log locations indicating a location of logs associated with the application comprises:

combining the relative file path specification of a log directory and the file name expression to create a command to locate and collect a log on the first computer for transfer of that log to a second computer.

6. The method of claim 1, wherein the first computer and the second computer are part of a storage area network.

7. The method of claim 1, wherein obtaining information at a first computer regarding a location in a second computer of at least one log associated with an application resident on the second computer comprises acquiring information stored in an XML file.

8. The method of claim 1, wherein the software comprises a Perl Script.

9. A computer program product including computer program code encoded in one or more non-transitory computer-readable storage media that, when executed on a processor of a first computer in a network, caused the first computer to:

obtain information regarding a location in a second computer in the network of at least one log associated with an application resident on the second computer;

create software configured to execute on the second computer to collect the at least one log at the second computer according to the obtained information regarding the location in the second computer of the at least one log and to transfer the collected at least one log to the first computer;

transfer the created software to the second computer for execution at the second computer; and receive, in response to execution of the transferred software on the second computer, the collected at least one log from the second computer.

10. The computer program product of claim 9, wherein the network is a storage area network.

11. The computer program product of claim 9, wherein the software comprises a Perl Script.

12. The computer program product of claim 9, wherein the created software further configured to cause the second computer to collect the at least one log in a single file.

13. The computer program product of claim 9, wherein information regarding a location in a second computer in the network of at least one log comprises a path name that indicates precisely where a file containing a log is located.

14. The computer program product of claim 9, wherein information regarding a location in a second computer in the network of at least one log comprises an environmental variable and a registry key that can be evaluated on the second computer to identify an installation directory associated with the application.

15. A network, comprising:

a first computer; and a second computer;

wherein the first computer is operable to:

obtain information regarding a location in the second computer of at least one log associated with an application resident on the second computer;

create software configured to execute on the second computer to collect the at least one log at the second computer according to the obtained information regarding the location in the second computer of at least one log and to transfer the collected at least one log to the first computer;

transfer the created software to the second computer for execution at the second computer; and receive, in response to execution of the transferred software on the second computer, the collected at least one log from the second computer; and wherein the second computer is configured to:

receive the software;

execute the software; and transfer the at least one collected log to the first computer.

16. The network of claim 15, wherein the network is a storage area network.

17. The network of claim 15, wherein the first computer is further configured to store acquired information sufficient for the second computer to collect the at least one log.

18. The network of claim 15, wherein the first computer is further configured to store, in an XML file, acquired information sufficient for the second computer to collect the at least one log.

19. The network of claim 15, wherein the software comprises a Perl Script.

20. The network of claim 15, wherein the second computer is further configured to transfer the at least one collected log to the first computer in a single file.

* * * * *